(12) United States Patent
Richardson et al.

(10) Patent No.: US 11,685,085 B2
(45) Date of Patent: Jun. 27, 2023

(54) TUBULAR MEMBER SEALING DEVICE

(71) Applicant: Zephyros, Inc., Romeo, MI (US)

(72) Inventors: Henry E. Richardson, Washington, MI (US); Alexander Gabriel Mangiapane, Macomb Township, MI (US); Jeffery Shantz, Metamora, MI (US)

(73) Assignee: Zephyros, Inc., Romeo, MI (US)

( * ) Notice: Subject to any disclaimer, the term of this patent is extended or adjusted under 35 U.S.C. 154(b) by 295 days.

(21) Appl. No.: 16/092,099

(22) PCT Filed: Apr. 21, 2017

(86) PCT No.: PCT/US2017/028780
§ 371 (c)(1),
(2) Date: Oct. 8, 2018

(87) PCT Pub. No.: WO2017/184946
PCT Pub. Date: Oct. 26, 2017

(65) Prior Publication Data
US 2019/0118431 A1 Apr. 25, 2019

Related U.S. Application Data

(60) Provisional application No. 62/325,877, filed on Apr. 21, 2016.

(51) Int. Cl.
*B29C 44/18* (2006.01)
*B62D 29/00* (2006.01)
(Continued)

(52) U.S. Cl.
CPC ......... *B29C 44/188* (2013.01); *B62D 29/002* (2013.01); *B29C 44/12* (2013.01);
(Continued)

(58) Field of Classification Search
CPC . B29C 44/12; B29C 44/1228; B29C 44/1233; B29C 44/1238; B29C 70/66;
(Continued)

(56) References Cited

U.S. PATENT DOCUMENTS 5,904,024 A   5/1999  Miwa
6,253,524 B1* 7/2001  Hopton ............... E04C 3/29
                                                52/843

(Continued)

OTHER PUBLICATIONS

European Communication dated Jul. 4, 2020, Application No. 17721920.1.
(Continued)

*Primary Examiner* — Seyed Masoud Malekzadeh
(74) *Attorney, Agent, or Firm* — The Dobrusin Law Firm, PC

(57) ABSTRACT

A member (10) for providing sealing, baffling, and/or reinforcement to a cavity member (30) comprising: (a) a carrier (12) with an insertion end (13) and a base end (11) having: (i) a base (16) at the base end (11) adapted for engaging with a wall (36) of the cavity member (30); (ii) a fastener (20) adapted for passing through an opening of the cavity member (32) and retaining the member (10) to the cavity member (30); (iii) a center portion (18) extending from the insertion end (13) to the base end (11); and (b) activatable material (26) disposed on the carrier (12).

20 Claims, 2 Drawing Sheets

(51) Int. Cl.
    *B29K 621/00*     (2006.01)
    *B29K 63/00*     (2006.01)
    *B29K 705/00*     (2006.01)
    *B29C 44/12*     (2006.01)
    *B29C 70/76*     (2006.01)
    *B60R 13/08*     (2006.01)
    *B29C 70/68*     (2006.01)

(52) U.S. Cl.
CPC ...... *B29C 44/1233* (2013.01); *B29C 44/1238* (2013.01); *B29C 70/68* (2013.01); *B29C 70/76* (2013.01); *B29K 2063/00* (2013.01); *B29K 2621/00* (2013.01); *B29K 2705/00* (2013.01); *B29K 2995/0002* (2013.01); *B60R 13/08* (2013.01)

(58) Field of Classification Search
CPC ......... B29C 70/68; B29C 70/78; B29C 70/74; B29C 70/742; B29C 70/747; B29C 70/76; B29C 70/766; B29C 70/80; B62D 29/002; B60R 13/08; B60R 13/0815
USPC .................. 425/4 R, 817 R, 256; 249/91, 96
See application file for complete search history.

(56) References Cited

U.S. PATENT DOCUMENTS

| | | | | |
|---|---|---|---|---|
| 6,305,136 B1 * | 10/2001 | Hopton | ............... | B29C 44/18 296/187.02 |
| 6,413,611 B1 * | 7/2002 | Roberts | ............... | B62D 29/002 296/193.06 |
| 8,127,506 B2 * | 3/2012 | Schneider | ............ | B62D 29/002 52/843 |
| 8,671,573 B2 * | 3/2014 | Larsen | ............... | B23P 17/04 296/187.02 |
| 10,479,012 B2 * | 11/2019 | Quaderer | ............... | B62D 29/04 |
| 11,045,989 B2 * | 6/2021 | Quaderer | ............... | B29C 48/154 |
| 2004/0262853 A1 * | 12/2004 | Larsen | ............... | B29C 48/605 277/628 |
| 2005/0012280 A1 * | 1/2005 | Richardson | ............ | F16J 15/104 277/628 |
| 2005/0268454 A1 * | 12/2005 | White | ............... | B62D 29/002 29/592 |
| 2005/0279567 A1 * | 12/2005 | Ito | ............... | B60R 13/08 181/207 |
| 2008/0023987 A1 * | 1/2008 | Schneider | ............... | B60J 5/0452 296/187.01 |
| 2008/0110694 A1 * | 5/2008 | Niezur | ............... | B62D 29/002 29/592 |
| 2011/0024933 A1 * | 2/2011 | Monnet | ............... | B60R 13/08 264/138 |
| 2012/0146296 A1 | 6/2012 | Deachin | | |
| 2012/0235401 A1 * | 9/2012 | Richardson | .......... | B62D 29/002 285/285.1 |
| 2013/0241226 A1 * | 9/2013 | Shantz | ............... | B22F 3/004 296/1.07 |
| 2018/0085986 A1 * | 3/2018 | Quaderer | ............... | B29C 48/131 |
| 2018/0257287 A1 * | 9/2018 | Quaderer | ............... | B29C 48/12 |
| 2019/0118431 A1 * | 4/2019 | Richardson | .......... | B29C 44/188 |
| 2020/0307058 A1 * | 10/2020 | Quaderer | ............... | B62D 29/04 |
| 2021/0283813 A1 * | 9/2021 | Quaderer | ............... | B29C 48/131 |

OTHER PUBLICATIONS

PCT Search Report & Written Opinion dated Jul. 12, 2017, Application No. PCT/US2017/028780.

First Chinese Office Action dated Oct. 26, 2020, Application No. 201780023914.1.

* cited by examiner

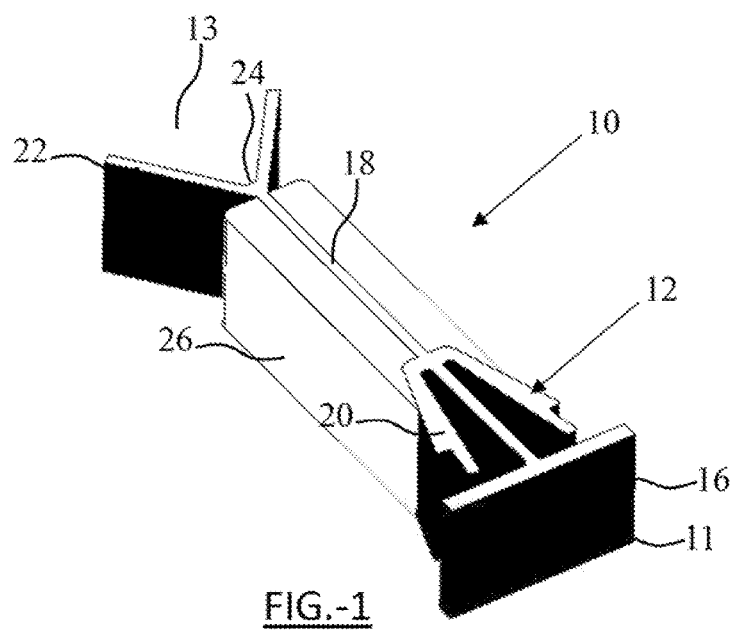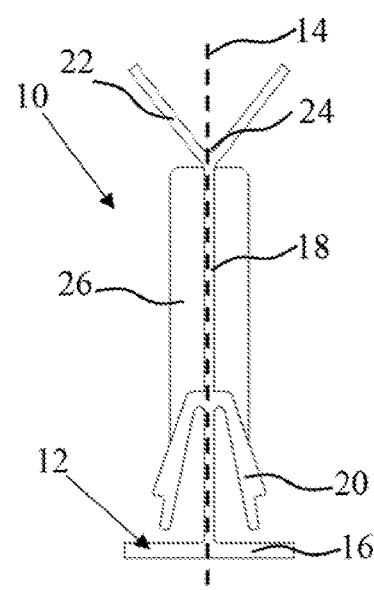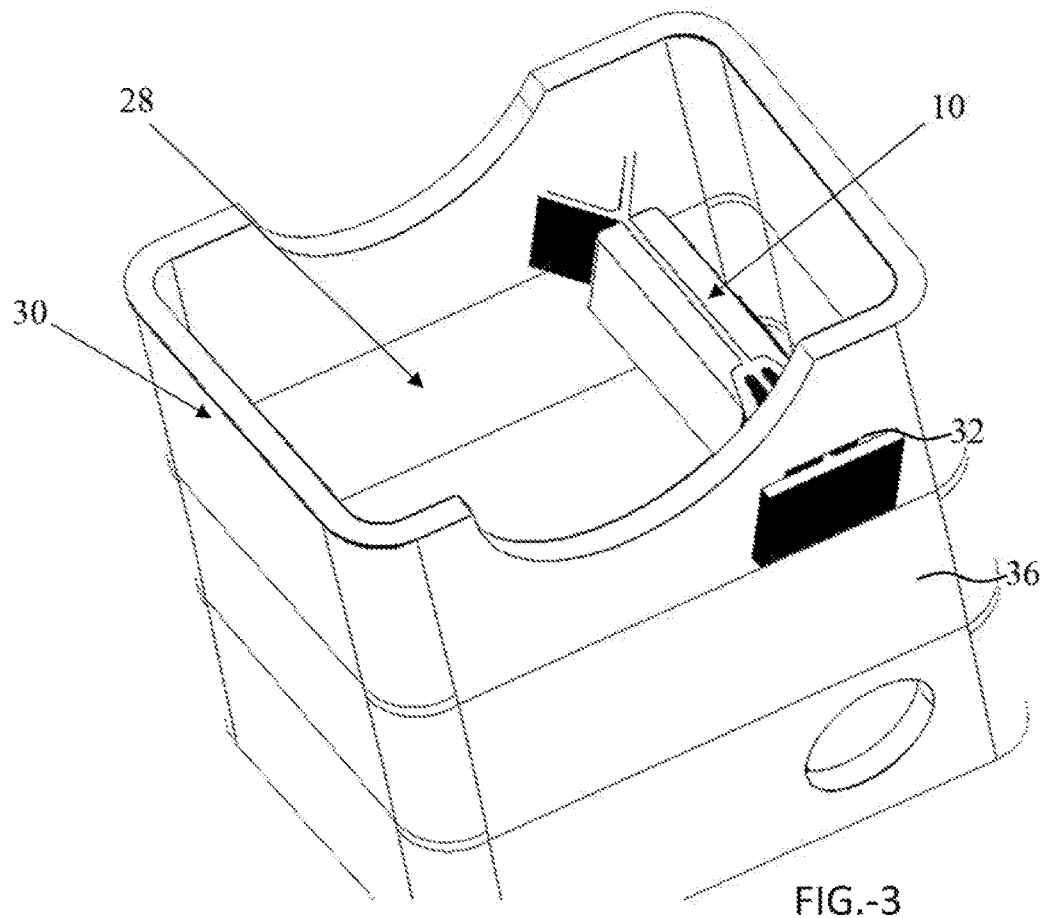

TUBULAR MEMBER SEALING DEVICE

FIELD

The present disclosure relates generally to a member, which may find particular use in sealing, noise/vibration reduction, structural reinforcement, or a combination thereof. The present disclosure may specifically relate to a member which may find particular use in sealing, noise/vibration reduction, structural reinforcement, or a combination thereof in tubular members having cavities and allowing for insertion of the member from outside of the cavity into the tubular member.

BACKGROUND

Industries, such as the automotive industry, rely on devices for baffling, sealing, or reinforcing. Such members typically include an activatable material, such as an expandable material, which may be combined with other components for forming a seal, a baffle, a structural reinforcement or the like in a cavity, such as cavity of an automotive vehicle. U.S. Pat. Nos. 7,784,186; 7,249,415; 5,755,486; 4,901,500; and 4,751,249, each of which is incorporated by reference, describe exemplary prior art devices for baffling, sealing, or reinforcing.

Currently, many members may need to be located into a cavity from within the inside of the cavity while the interior of the cavity is at least partially exposed or to a wall of the cavity prior to assembling the wall with at least one second wall to form the cavity. To allow for more flexibility in the installation of these members, what is needed is a member which can provide baffling, sealing, and/or reinforcing and which can be installed into a cavity from outside of the cavity. For example, tubular reinforcement members with at least partially hollow cavities can use a member which can be installed from outside of the cavity such that the member can then provide baffling, sealing, and/or reinforcing to the tubular reinforcement member from within the cavity.

SUMMARY

The present disclosure relates a member for providing sealing, baffling, and/or reinforcement to a cavity member comprising: (a) a carrier with an insertion end and a base end having: (i) a base at the based end adapted for engaging with a wall of the cavity member; (ii) a fastener adapted for retaining the carrier to the cavity member; (iii) a center portion extending from the insertion end to the base end; and (b) activatable material disposed on the carrier.

The present disclosure further relates to a cavity member including the member of the disclosure, wherein the cavity member includes a first opening in a first wall of the cavity member. In some preferred embodiments, the cavity member may include the base located outside of the cavity member. In some preferred embodiments, the cavity member may include at least a portion of the carrier received within the first opening and at least a portion of the carrier residing within a hollow interior of the cavity. In some preferred embodiments, wherein the fastener may be located adjacent the base and may be adapted to pass through the first opening; and the fastener and the base may be adapted to engage with the first wall to retain the member to the cavity member. In some preferred embodiments, the cavity member may include a second opening on a second wall of the cavity member. In some preferred embodiments, the fastener may be located adjacent the central portion and at the insertion end of the carrier; and the fastener may engage with the second opening and the second wall such that the base may retain the member onto the cavity at the first wall and first opening and the fastener may retains the member onto the cavity at the second wall and the second cavity.

The present disclosure further relates to a method for providing baffling, sealing, and or reinforcing comprising (i) inserting the member of the teachings herein into a first opening of the cavity member by inserting the insertion end and fastener into and through the first opening and retaining the base outside of the cavity member; and (ii) activating the activatable material to provide baffling, sealing, and/or reinforcing to the cavity member.

The member, carrier member, and method of the disclosure may resolve the need to provide for a baffling, sealing, or structural reinforcement device which is able to be installed from outside of the cavity member. The member may provide a carrier which can be inserted from outside of the cavity member and be at least partially disposed into the cavity member. The member may provide a carrier with a fastener which may be able to retain the member inside of a cavity member both before and after activation of the activatable material.

BRIEF DESCRIPTION OF THE DRAWINGS

FIG. 1 is a perspective view of an exemplary member having a fastener and base which engage with a first wall of a cavity member according to the teachings herein.

FIG. 2 illustrates a cross-section of the exemplary member of FIG. 1 according to the teachings herein.

FIG. 3 illustrates a cavity member including the exemplary member of FIG. 1 according to the teachings herein.

DETAILED DESCRIPTION

Figure 4:
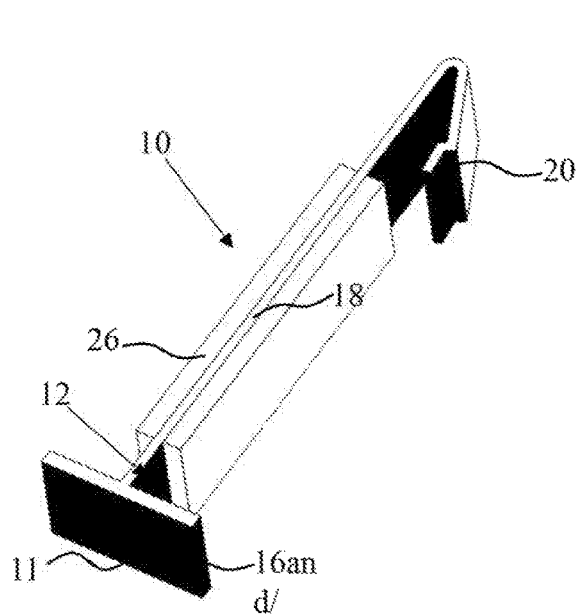
FIG. 4 is a perspective view of an exemplary member having a base which engages with a first wall of a cavity member and a fastener which engages with a second wall of the cavity member according to the teachings herein.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the priority date of U.S. Provisional Application Ser. No. 62/325,877, filed Apr. 21, 2016, the contents of that application being hereby incorporated by reference for all purposes.

The disclosure relates to a member which may be a member for providing baffling, sealing, reinforcing, or a combination thereof to an article of manufacture. The member may include a carrier; the carrier may have an insertion end and a base end; the carrier may include a base at the base end adapted for engaging with a wall of the cavity member; a fastener adapted for passing through an opening of the cavity member and retaining the member to the cavity member; a center portion extending from the insertion end to the base end. The member may also include activatable material disposed on the carrier. The member may specifically be adapted to provide sealing, baffling or reinforcement within a structure's cavity. The member may find a particular benefit in conforming to a variety of cavity sizes and shapes. For example, a single configuration of the member may provide sealing, baffling, or reinforcement to multiple cavity configurations by conforming to each cavity configuration by flexing, bending, or deforming at one or more hinges. For example, a single configuration of the member may provide sealing, baffling, or reinforcement for multiple lengths of a tubular cavity member by having one or more carrier extensions which may bend at one or more hinges to shorten the overall length of the cavity member. It is contemplated that the member may be applied (e.g., assembled) to various articles of manufacture such as boats, trains, buildings, homes, furniture, or the like. It has been found however, that the member is particularly suitable for application to automotive vehicles.

The member of the disclosure includes a carrier. The carrier may function to affix the member to a surface, provide a base for one or more carrier extensions, provide a base for one or more fasteners, provide a surface for activatable material, or a combination thereof. The carrier may have a longitudinal axis. The carrier may include an insertion end, a base end, or both. The insertion end may be the end of the carrier inserted first into a cavity member. The base end may be opposite the insertion end. The base end may remain outside of the cavity member when the member is inserted into a cavity member. The carrier may be rigid, flexible, or a combination of both rigid portions and flexible portions. The carrier may be flexible or have flexible portions and thus may be formed to facilitate movement of the carrier and/or one or more carrier extensions along more than one axis. The carrier may be rigid to allow the carrier to be easily inserted through one or more openings of a cavity member. The carrier may include portions having a material thickness that is greater than the material thickness at other portions of the carrier. The portions having a greater thickness may be arranged in a position that is substantially parallel to or substantially perpendicular to a portion having a smaller thickness. The carrier may include an activatable material which may be located only onto select portion of the carrier. The activatable material may substantially enclose the entirety of the carrier. The carrier may have a central portion. A portion of the carrier, such as a central portion or an end segment, may split into two distinct split portions. Split portions of the carrier may be substantially parallel to one another or may be arranged in a non-parallel relationship. The split portions may be located at a terminating end of the carrier. The split portions may be formed such that they act as a fastener for locating the carrier in a desired location such that the split portions are located into and/or through an opening or receive a surface. The split portions may flex to allow to allow the overall length of the carrier to shorten, such as when force is applied to the split portions they may bend. Portions of the carrier may be located in different planes from one another. One or more of the carrier extensions may include protrusions which extend into the activatable material, such as to aid in retaining the activatable material on the carrier extension. The carrier may be attached to or integral with one or more fasteners, one or more extensions, one or more segments of activatable material, or a combination thereof. A portion of the carrier, such as the central portion, may bisect one or more extensions.

The carrier may include a base portion. The base portion may act as a stop to prevent or restrict the carrier from further being inserted into the cavity member. The base portion may cooperate with one or more fasteners to engage and retain the member to a cavity member. The base portion may have a width, length, diameter, and/or or other dimension greater than a width, length, or diameter of at least one opening of the cavity member. The base portion may have a greater cross-section area than a cross-section area of an opening of the cavity member, such that the base portion is restricted or prevented from entering into an opening of the cavity member.

The member may include one or more fasteners. The one or more fasteners may function to affix the carrier to a surface, such as a wall of a cavity. The one or more fasteners may be integrally formed with the carrier and/or one or more carrier extensions or separately formed from the carrier and/or one or more carrier extensions. The carrier may include one or more fasteners that are located so that they correspond with openings formed in a wall. The carrier may include a single fastener to be located into a wall opening or a plurality of fasteners located adjacent one another to be located into a plurality of adjacent wall openings. The one or more fasteners may include a fir tree fastener, arrowhead fastener, push pin fastener, clip fastener, the like, or any combination thereof. The fastener may be an arrowhead fastener whereby one or more terminal ends of the arrowhead include surfaces formed to contact and exert a force on a surface adjacent an opening in wall. The fastener may be shaped to include surfaces that lie in direct planar contact with a surface that lies adjacent an opening (e.g., an opening into which the fastener is located). The member may include a single fastener or a plurality of fasteners. The one or more fasteners may be into and/or through an opening of a surface, such as a cavity wall, to affix the member. The one or more fasteners may receive a surface, such as a protrusion from a cavity wall, to affix the member. A carrier including multiple fasteners may be formed so that a first fastener is located in a first plane and a second fastener is located in a second plane that is the same or different from the first plane. A plurality of fasteners may be arranged parallel to one another. The plurality of fasteners may be arranged such that a first fastener may be perpendicular to a second fastener. The carrier may have sufficient flexibility so that prior to insertion into openings, a first fastener and second fastener may be located parallel to one another (e.g., in a first position relative to each other), but during use and upon insertion into openings, the first and second fasteners are located in a non-parallel relationship relative to each other (e.g., in a second position relative to each other). The one or more fasteners may be located at a base end, an insertion end, or both of the carrier. The one or more fasteners may cooperate with an insertion end, a base end, or both of the carrier.

The carrier may include one or more carrier extensions. The one or more carrier extensions may affix the member to at least one surface, one or more cavities, or both. The one or more carrier extensions may deform, such as at one or more hinges, to allow the member to conform to a variety of cavity sizes and shapes. The one or more carrier extensions may carry activatable material, guide the expansion of activatable material. The extensions may be of differing length or may be substantially similar in length. A first extension having a first length may be located in between two adjacent second extensions having a length that is shorter than the first lengths. Alternatively, a first extension may have a first length that is shorter than the length of one or more adjacent extensions. The carrier may have extensions that extend away from one another or toward one another. The one or more carrier extensions may be rigid, flexible, or include both rigid portions and flexible portions. The one or more carrier extensions may each be entirely flexible, with include portions having greater flexibility than other portions. The one or more extensions may extend from a central portion of the carrier, which central portion may be in substantial alignment with the longitudinal axis. The one or more extensions may be connected or affixed to the carrier at one or more joints. The one or more extensions may be separate from or integral with the carrier. The one or more extensions may extend from the carrier along any length of the carrier. The one or more extensions may be arranged in a substantially perpendicular arrangement with the central portion of the carrier. Alternatively, the one or more extensions may extend from the central portion of the carrier at a skew angle. The carrier may include extensions that extend at both skew and perpendicular angles. One or more of the carrier extensions may lie in the same plane, differing plane, or both as one or more other carrier extensions. One or more of the carrier extensions may include activatable material thereon. The area between one or more extensions may be substantially free of any activatable material. Alternatively, the area between one or more extensions may be substantially filled with activatable material, or may be only partially filled with activatable material. One or more of the carrier extensions may include protrusions which extend into the activatable material, such as to aid in retaining the activatable material on the carrier extension. The carrier may include one, two, three, four, five, six, eight, ten or more carrier extensions or any number therebetween. The carrier may include twenty, eighteen, sixteen, fifteen or less carrier extensions or any number therebetween. The one or more carrier extensions may be inserted into the same cavity or one or more of each of the individual carrier extensions may be inserted into one or more separate cavities. For example, all of the carrier extensions may be inserted into the same cavity as the carrier. For example, a first extension may be placed into a first cavity, a second extension into a third cavity, and a fourth extension into a fourth cavity. The one or more carrier extensions may be inserted into one or more individual cavities to facilitate bending or movement of the one or more individual cavities in relation to other cavities or surfaces, while simultaneously providing for sealing, baffling, and/or structural reinforcement to each of the individual cavities. The carrier extensions may flex, bend, deform, or the like about one or more hinges.

The member may include one or more hinges. The one or more hinges may facilitate and/or guide flexing of the carrier, the carrier extensions, or both. The one or more hinges may allow or facilitate the member to conform to the shape and/or size of one or more cavities into which the member may be inserted and/or installed. The one or more hinges may include a single hinge or a plurality of hinges. The one or more hinges may be free of any bending or flexing along the hinge until pressure is applied to one or more portions of the carrier, carrier extensions, or any combination thereof. The one or more hinges may bend or flex under their own weight without the application of additional pressure. The one or more hinges may bend under the weight of the carrier, one or more carrier extensions, or both by about 10 degrees, 30 degrees, 45 degrees, 90 degrees, or more, or any degree in between. The one or more hinges may bend under the weight of the carrier, one or more carrier extensions, or both by about 180 degrees, 160 degrees, 150 degrees, 135 degrees, or less, or any degree in between. The one or more hinges may be formed as joints, notches, indents, weak points, areas of the carrier and/or the carrier extensions substantially free of activatable material, living hinges, the like, or any combination thereof. Placement of the activatable material to achieve or support one or more hinges can be understood from U.S. patent application Ser. No. 13/804,840, incorporated by reference herein for all purposes. The one or more hinges may be formed by portions of the carrier, carrier and/or extensions having a thinner cross-section than adjacent portions of the carrier and/or carrier cross-section. The one or more hinges may be formed by portions of the carrier and/or carrier extensions having a preformed curved shape. The one or more hinges may be located along a length of one or more of the carrier extensions, the carrier, or both. The one or more hinges may be formed at or may be the one or more joints where one or more carrier extensions extend from the carrier. The carrier, one or more carrier extensions, or both may each have one, two, three, four, five, six, eight, ten or more hinges or any number therebetween. The carrier, one or more extensions, or both may include twenty, eighteen, sixteen, fifteen or less hinges or any number therebetween. The hinges may allow the carrier, one or more carrier extensions, or both to bend into an acute angle about the hinge. The hinges may allow bending of each carrier extension at the hinge to an angle about less than 90 degrees, about less than 75 degrees, about less than 50 degrees, about less than 45 degrees, about less than 10 degrees, or even less, or any degree therebetween. The hinges may allow bending of each carrier extension to an angle about more than 1 degree, about more than 3 degrees, about more than 5 degrees, or even more, or any degree therebetween.

At least a portion of the carrier, one or more carrier extensions, or any combination thereof may have a thin profile (e.g., a profile that is thinner than adjacent portions of the carrier and/or carrier extension). The thin profile portion may be such that it can be located in areas where the surface upon which the carrier is located must remain substantially flat. The thin profile portion may be connected to a fastener having a substantially thicker profile such that the thickness of the fastener assists in maintaining the thin profile portion in a flat position on a surface adjacent the fastener.

The carrier may comprise a polymeric material, a metallic material, or a combination thereof. The carrier may comprise a composite material, a woven material, or a combination thereof. The activatable material may comprise an epoxy. One or more of the carrier material and/or activatable material may comprise a composite member that is formed by contacting an epoxy/amine reaction product material (e.g., a material that is a reaction product of a diepoxide and a primary amine, such as monoethanolamine, or the reaction product of a diepoxide resin (e.g., BPA), a mono primary amine, a di-secondary amine, a dimer captan and/or a di-carboxylic acid) during a step of extrusion, injection molding, pultrusion or any combination thereof. The contacting may be only after the reaction has completed between the epoxy and the amine (e.g., only after the reaction of epoxy and amine), as described in U.S Provisional Application No. 62/130,908, incorporated by reference herein for all purposes.

The member may include activatable material located on the carrier, one or more carrier extensions, or any combination thereof. The activatable material may be located onto substantially the entirety of the carrier or alternatively may be located onto only portions of the carrier. The activatable material may be located onto substantially the entirety of one or more of the carrier extensions or alternatively may be located onto only portions of one or more of the carrier extensions. The activatable material may substantially entirely enclose the entirety of the carrier, one or more carrier extensions, or any combination thereof Alternatively, the activatable material may substantially enclose only portions of the carrier, portions of one or more carrier extensions, or any combination thereof. The activatable material may extend beyond an end of the carrier. Alternatively, the activatable material may be substantially coextensive with an end of the carrier. The activatable material may be located onto any portion of the member, such as the carrier, that forms a fastener. The activatable material may substantially enclose any portion of the member, such as the carrier, which forms a fastener. Any portion of the carrier which forms a fastener may also be substantially free of any activatable material. The activatable material may be located on one or more hinges or alternatively, one or more hinges may be substantially free of any activatable material. The activatable material itself may be formed to have a curved profile. In the event that the activatable material is not co-extensive with the carrier, the activatable material that extends beyond an end of the carrier may be curved. Any angle of curvature for one or more of the carrier and activatable material may be selected based upon the intended location of the device which may depend upon the shape of a cavity into which the device is to be located. The carrier and/or activatable material may be curved in a single direction or may be curved in multiple directions. The curve may form a substantially u-shaped or substantially v-shaped device.

The method of forming the member of the disclosure may comprise providing a carrier material and extruding and/or pultruding an activatable material on at least a portion of the carrier material, whereby the activatable material may be co-extruded and/or pultruded with the carrier material. Formation of the member of the disclosure may include a variety of processing steps depending on the desired configuration of the member. In any event, it is generally contemplated that the carrier, the one or more carrier extensions, and the activatable material may be manually attached to each other, automatically attached to each other, or a combination thereof. Moreover, various processes such as molding (e.g., compression, injection, or other molding), extrusion, pultrusion, or the like may be used to form the carrier, the activatable material, the one or more fasteners, the one or more carrier extensions, the one or more activatable material extensions, and such processes may be employed to attach these components together. One or more of the carrier and/or activatable material may be formed in processes disclosed in U.S. Provisional Application No. 62/074,237, incorporated by reference herein for all purposes. The carrier material may be provided by extrusion; the carrier material may be simultaneously extruded with the activatable material; the activatable material and/or the carrier material may be further extruded to form a profile configuration; and the one or more fasteners may be formed as part of the carrier material or separate from the carrier material.

The method for inserting and activating the member to providing baffling, sealing, and or reinforcing may comprise: inserting the member according to the teachings herein into a first opening of the cavity member by inserting the insertion end and fastener into and through the first opening and retaining the base outside of the cavity member; and activating the activatable material to provide baffling, sealing, and/or reinforcing to the cavity member.

The method of inserting, activating, or using the member of the disclosure may further comprise any one or more of the following steps or features described in this specification in any combination, including the preferences and examples listed in this specification, and including the following: the first opening of the cavity member may be located in a first wall of the cavity member; the step of inserting the member may include engaging the member by engaging the fastener with the first wall such that the fastener and the base may include at least a portion of the first wall there between; the first opening of the cavity member may be located in a first wall of the cavity member; the cavity member may include a second wall distanced from and parallel to the first wall and the second wall includes a second opening; the step of inserting the member may include inserting the insertion end and fastener into and through the second opening and retain the base outside of the cavity member at the first wall; inserting the member may include engaging the member by engaging the fastener with the second wall after it passes through the second opening; installing the member into the cavity member, such as a vehicle cavity; and the method may comprise activating the activatable material so that it expands and substantially fills the cavity member.

The following descriptions of the Figures are provided to illustrate the teachings herein, but are not intended to limit the scope thereof.

FIGS. 1 and 2 illustrate a member 10 according to the teachings herein. The member 10 includes a carrier 12 having a longitudinal axis 14. The carrier 12 includes a base end 11 and an insertion end 13. A base 16 may be located at the base end 11. A center portion 18 may connect or extend from the base 16 to the insertion end 13. The carrier 12 may include one or more extensions 22 which may be a split portion of the carrier 12. The one or more extensions 22 may be connected at a hinge portion 24. The hinge portion 24 may allow the one or more extensions 22 to flex such that they bend upon application of force to shorten the overall length of the carrier 12. The carrier 12 may include a fastener 20. The fastener 20 may be located between the base end 11 and the insertion end 13. The fastener 20 may be located between adjacent the base 16. The member 10 may include activatable material 26 disposed on any portion of the carrier 12. The activatable material 26 may be disposed about at least a portion of the center portion 18, the fastener 20, and or even the base 16.

FIG. 3 illustrates a cavity member 30 including the member 10 of FIGS. 1 and 2. The cavity member 30 may be a tubular member, such as a tubular reinforcement structure. The cavity member 30 may be hollow with a cavity 28. The cavity member 30 may include a first opening 32. The member 10 may be inserted such that the base 16 is located outside a first wall 36 of the cavity member 30. The member 10 may be inserted such that the first wall 36 is located between the fastener 20 and the base 16. The member 10 may be retained on the cavity member 30 and within the cavity 28 by the fastener 20 and the base 16 retaining the first wall 36 therebetween. The one or more extensions 22 may flex or bend to allow the one or more extensions to fit through the first opening 32 and/or to adjust the length of the member 10 to the length or width of the cavity 28.

Figure 7:
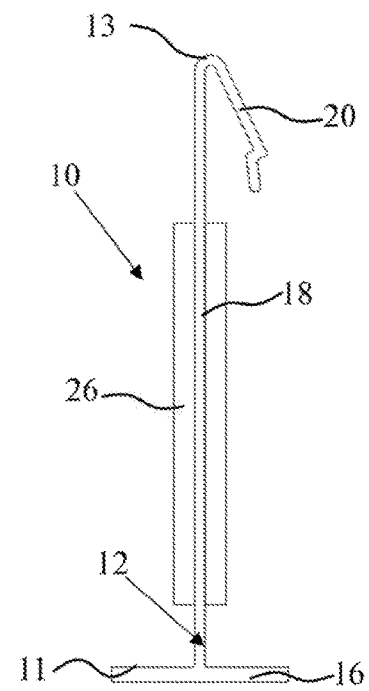
FIG. 7 illustrates a cross-section of the exemplary member of FIG. 4 according to the teachings herein.

FIGS. 4 and 7 illustrate a member 10 according to the teachings herein. The member 10 includes a carrier 12 having a longitudinal axis 14. The carrier 12 includes a base end 11 and an insertion end 13. A base 16 may be located at the base end 11. A center portion 18 may connect or extend from the base 16 to the insertion end 13. The carrier 12 may include a fastener 20. The fastener 20 may be located at the insertion end 13 and may be opposite the base 16. The member 10 may include activatable material 26 disposed on any portion of the carrier 12. The activatable material 26 may be disposed about at least a portion of the center portion 18.

Figure 5:
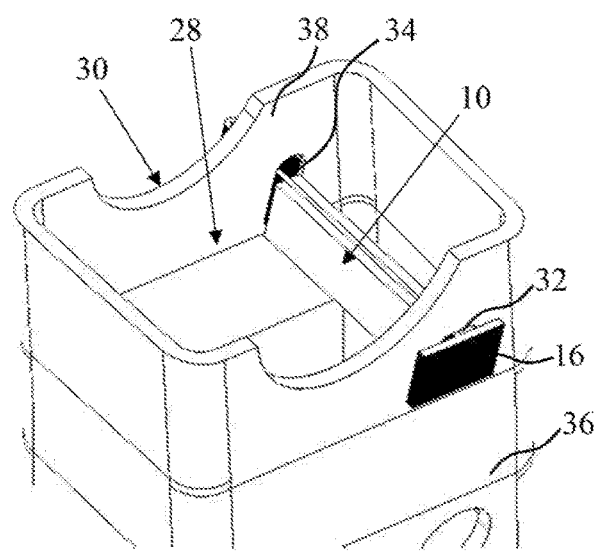
FIG. 5 illustrates a cavity member including the exemplary member of FIG. 4
Figure 6:
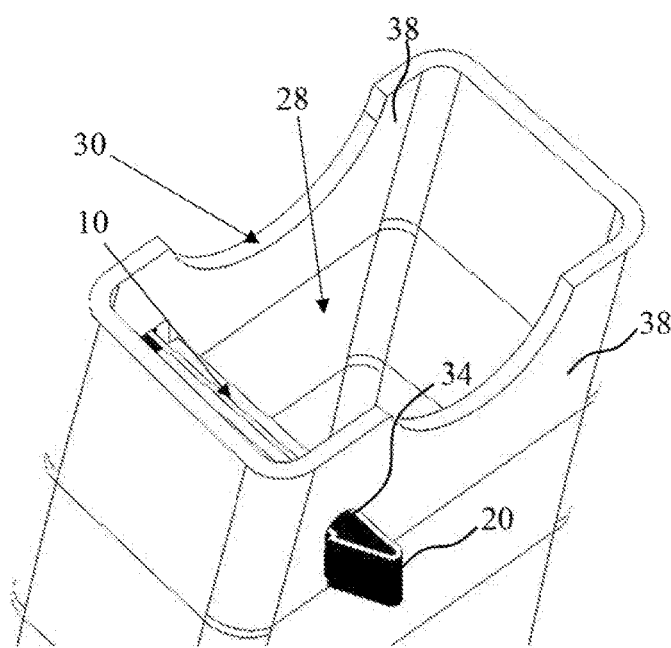
FIG. 6 illustrates a cavity member including the exemplary member of FIG. 4.

FIGS. 5 and 6 illustrate a cavity member 30 including the member 10 of FIGS. 4 and 7. The cavity member 30 may be a tubular member, such as a tubular reinforcement structure. The cavity member 30 may be hollow with a cavity 28. The cavity member may include a first wall 36 and a second wall 38. The cavity member 30 may include a first opening 32 and a second opening 34. The first opening 32 may be located within the first wall 36. The second opening 34 may be located within the second wall 38. The first wall and the second wall may be parallel to and distanced from one another. The member 10 may be inserted such that the base 16 is located outside a first wall 36 of the cavity member 30. The member 10 may be inserted such that the center portion 18 passes through both the first opening 32 and the second opening 34. The member 10 may be inserted such that the fastener 20 passes first through the first opening 32 and then the second opening 34 to engage with the second wall 38.

LISTING OF REFERENCE NUMERALS

10 Member
11 Carrier first end
12 Carrier
13 Carrier second end
14 Longitudinal axis
16 Carrier base
18 Central portion
20 Fastener
22 One or more extensions
24 One or more hinges
26 Activatable material
28 Cavity
30 Cavity member
32 Member first opening
34 Member second opening
36 Cavity member first wall
38 Cavity member second wall Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

What is claimed is:

1. A member for providing sealing, baffling, and/or reinforcement to a cavity member comprising:
   a) a carrier with an insertion end and an opposing base end having:
      a. a base at the base end adapted for engaging with a first wall of the cavity member, the first wall opposing a second wall;
      b. a mechanical fastener at the insertion end that passes through an opening in the second wall from an interior of the second wall to an exterior of the second wall of the cavity member and retains the member to the cavity member, the mechanical fastener including a terminal end configured to directly contact a surface adjacent the exterior of the second wall and to put a pressure on the surface adjacent the exterior of the second wall so that the fastener remains in place;
      c. a center portion extending from the insertion end to the base end; and
   b) activatable material disposed on the carrier;
   wherein the base lies in direct contact with an exterior of the first wall of the cavity member during use.

2. The member of claim 1, wherein the base is configured to be larger than at least one opening of the cavity member.

3. The member of claim 1, wherein the activatable material is disposed on the center portion, the base, the fastener, or any combination thereof.

4. The member of claim 2, wherein the carrier has a length which is greater than a width of the cavity member.

5. The member of claim 2, wherein the fastener includes at least a section of the center portion, such that the fastener and the base are adapted to receive the second wall and the first wall of the cavity member respectively, between the fastener and the base.

6. The member of claim 4, wherein the activatable material partially encircles a portion of the carrier.

7. The member of claim 1, wherein the carrier includes one or more extensions.

8. The member of claim 7, wherein the one or more extensions are located at the insertion end which is opposite the base end.

9. The member of claim 1, wherein the cavity member is a tubular member with at least a partially hollow interior.

10. The member of claim 7, wherein the member has a length which is greater than a width of the cavity member.

11. The member of claim 10, wherein the cavity member is a tubular member with at least a partially hollow interior.

12. The member of claim 9, wherein the member has a length which is greater than a width of the cavity member.

13. The member of claim 1, wherein at least a portion of the carrier is rigid.

14. The member of claim 1, wherein at least a portion of the carrier is flexible.

15. The member of claim 12, wherein at least a portion of the carrier is rigid.

16. The member of claim 12, wherein at least a portion of the carrier is flexible.

17. The member of claim 1, wherein the center portion has a substantially constant cross-section.

18. The member of claim 13, wherein the center portion has a substantially constant cross-section.

19. The member of claim 1, wherein the center portion includes a hinge that allows the center portion to adjust according to cavities of varying sizes.

20. The member of claim 13, wherein the center portion includes a hinge that allows the center portion to adjust according to cavities of varying sizes.

\* \* \* \* \*